United States Patent
Pundlik

(10) Patent No.: US 10,817,558 B1
(45) Date of Patent: Oct. 27, 2020

(54) METHODS FOR PRODUCING SITEMAP FOR USE WITH GEOGRAPHIC INFORMATION SYSTEMS

(71) Applicant: Anuja Dilip Pundlik, Santa Clara, CA (US)

(72) Inventor: Anuja Dilip Pundlik, Santa Clara, CA (US)

( * ) Notice: Subject to any disclaimer, the term of this patent is extended or adjusted under 35 U.S.C. 154(b) by 234 days.

(21) Appl. No.: 15/632,268

(22) Filed: Jun. 23, 2017

Related U.S. Application Data

(60) Provisional application No. 62/354,713, filed on Jun. 25, 2016.

(51) Int. Cl.
| | | |
|---|---|---|
| *G06F 16/00* | (2019.01) | |
| *G06F 16/487* | (2019.01) | |
| *G01C 21/00* | (2006.01) | |
| *G06F 16/29* | (2019.01) | |
| *G06F 16/9537* | (2019.01) | |

(52) U.S. Cl.
CPC ......... *G06F 16/487* (2019.01); *G01C 21/005* (2013.01); *G06F 16/29* (2019.01); *G06F 16/9537* (2019.01)

(58) Field of Classification Search
CPC .................................................... G06F 16/487
See application file for complete search history.

(56) References Cited

U.S. PATENT DOCUMENTS

| | | | |
|---|---|---|---|
| 8,434,029 | B2 | 4/2013 | Albright |
| 8,825,387 | B2 | 9/2014 | Mays et al. |
| 9,068,846 | B1 | 6/2015 | Boerger |
| 9,355,552 | B2 | 5/2016 | Murphy, Jr. et al. |
| 9,465,816 | B2 | 10/2016 | Johnson et al. |
| 9,503,858 | B2 | 10/2016 | Palanki et al. |
| 9,619,124 | B2 | 4/2017 | Morrison et al. |
| 9,632,671 | B2 | 4/2017 | Albright |
| 2003/0135330 | A1* | 7/2003 | Carroll ................ G06F 16/58 702/5 |
| 2007/0226004 | A1* | 9/2007 | Harrison ............. G06Q 30/02 705/26.1 |
| 2007/0273624 | A1* | 11/2007 | Geelen ............. G06Q 20/102 345/84 |
| 2014/0019302 | A1* | 1/2014 | Meadow ............. G06T 19/00 705/26.61 |
| 2014/0240786 | A1* | 8/2014 | Honda ................ H04N 1/387 358/1.18 |
| 2016/0110823 | A1* | 4/2016 | Wood ................ G06Q 50/163 705/314 |
| 2016/0381537 | A1 | 12/2016 | Bangalore et al. |
| 2017/0103145 | A1 | 4/2017 | Wither et al. |
| 2017/0138740 | A1 | 5/2017 | Almalki et al. |

* cited by examiner

*Primary Examiner* — Grace Park
(74) *Attorney, Agent, or Firm* — Douglas L. Weller

(57) ABSTRACT

A method for producing a geospatial sitemap for a property includes obtaining a sitemap of the property. Within the sitemap, regions that represent buildings and internal roads are identified. Associated with each region in the sitemap that represents a building is geospatial metadata for the property that provides geospatial information pertaining to the region and addressing information that pertains to the region.

13 Claims, 22 Drawing Sheets

METHODS FOR PRODUCING SITEMAP FOR USE WITH GEOGRAPHIC INFORMATION SYSTEMS

BACKGROUND

Residential and commercial properties such as apartment dwellings, condominiums, business offices and stores fronts often have multiple addressable subparts. Each addressable subpart may be a single apartment, town home, individual condominium, a numbered office, a store front or any other subpart of the main property that has a separate address. Many people live or work in these types of residential housing, office complex and store complex. Additionally, with the increased use of on-line shopping, this results in lots of deliveries to individuals in properties with multiple addressable subparts. Typical deliveries to residences include consumer durables, food items including grocery and ready to eat deliverables, parcel services and so on.

Delivery service personnel, acquaintances, taxis, ride sharing companies, can often locate a property that has multiple addressable subparts using a global positioning system (GPS) device; however, directions to particular addressable subpart inside such property may not be readily available using a GPS device.

DETAILED DESCRIPTION

As consumer online shopping increases, this increases the number of packages to be delivered. Time to perform delivery can be increased when delivery agents have to search for a particular addressable subpart within a property that has multiple addressable subparts.

In many cases, a GPS system can bring a user to the entrance of a property. However, the GPS system does not necessarily provide directions to a particular addressable subpart within a property that has multiple addressable subparts.

A locator system as described below provides help in locating such an addressable subpart. For example, the locator system provides search ability to an addressable subpart of property, when such capability is not otherwise provided by GPS. For example, the locator system gives exact location and directions to an addressable subpart within a property that has multiple addressable subparts.

Figure 1:
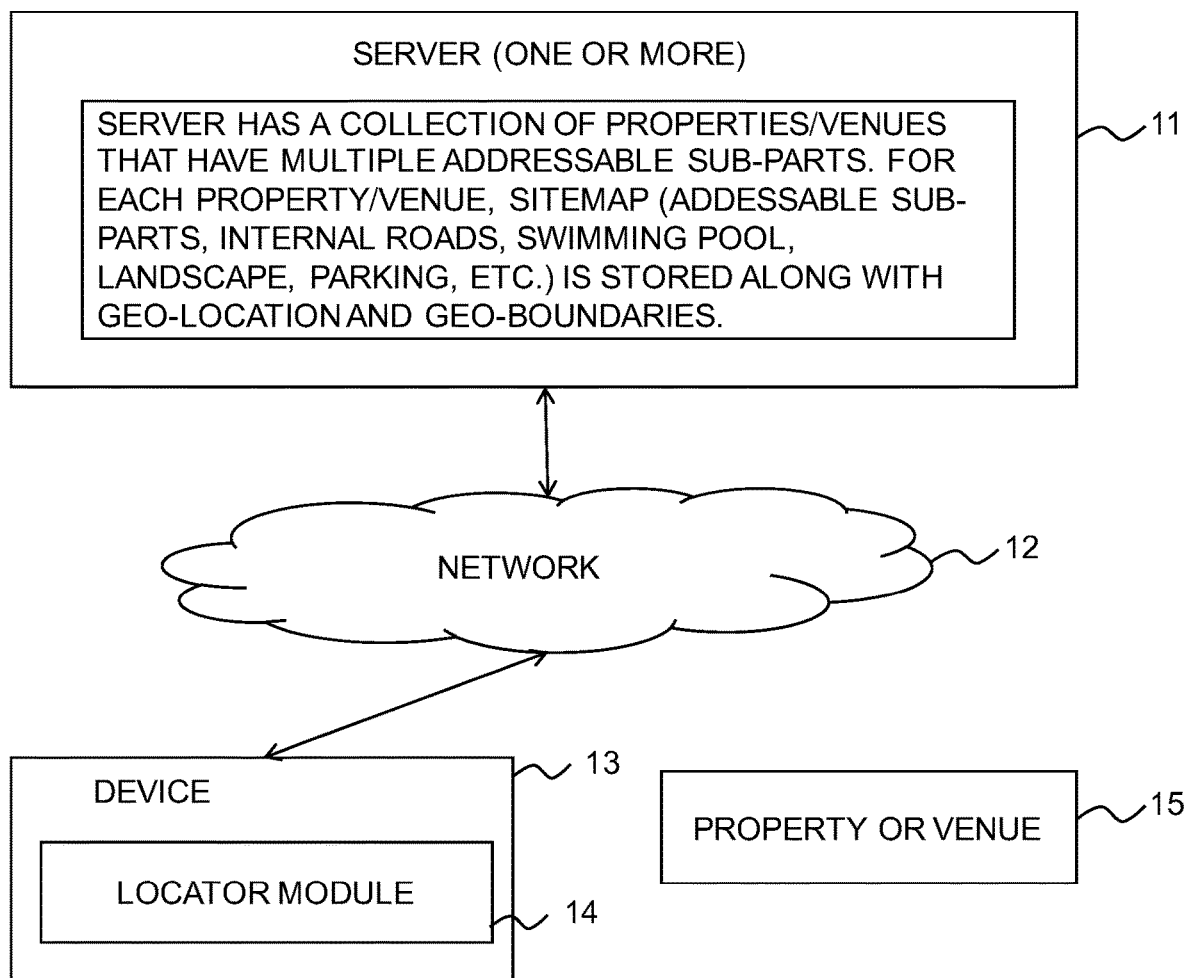
FIG. 1 is a simplified block diagram of a locator system that provides location of and path to an addressable subpart of a property in accordance with an implementation.

FIG. 1 shows a simplified block diagram of a locator system. A locator module 14 is located on a portable or non-portable device 13 that has sufficient processing power to implement functionality of locator module 14 along with ability to connect to a network. For example, portable or non-portable device 13 can be any type of computing device, such as a personal computer, laptop computer, tablet computing device, a smart phone, a digital assistant and so on.

For example, device 13 can be connected through a network 12 to one or more servers represented by a server 11 shown in FIG. 1. Network 12 is, for example, the Internet, a cellular phone network or any other type of network or combination of network(s) that allow portable or non-portable device to connect to a server.

Server 11, for example, contains a database with a list of properties. The list of properties may include, for example, properties for which information like, but not limited to, sitemap, location of addressable subparts, walkways on the property, etc. is available in a geospatial data format used in a geographic information system (GIS). While the list of properties is described as being within server 11, the list of properties can be in any other location where it is accessible to locator module 14. The list of properties, for example, wherever located is a part of a database that stores the above-mentioned information on properties in GIS format along with other information available about each property. Property 15 represents a property or venue for which a sitemap is available within the locator system. The use of a database to store a list of properties and their information in GIS format is exemplary and refers to any organized storage of information. Data may be stored in a relational or any other kind of database like NoSQL or in flat files which are also referred to herein as a database that is an organized store of information. Thus, the term database represents any storage system used to a store list of properties and their information in GIS format. If network 12 connectivity is not available, the locator module 14 can operate in offline mode, wherein list of properties and their information in GIS format is stored in the locator module 14 itself.

Figure 2:
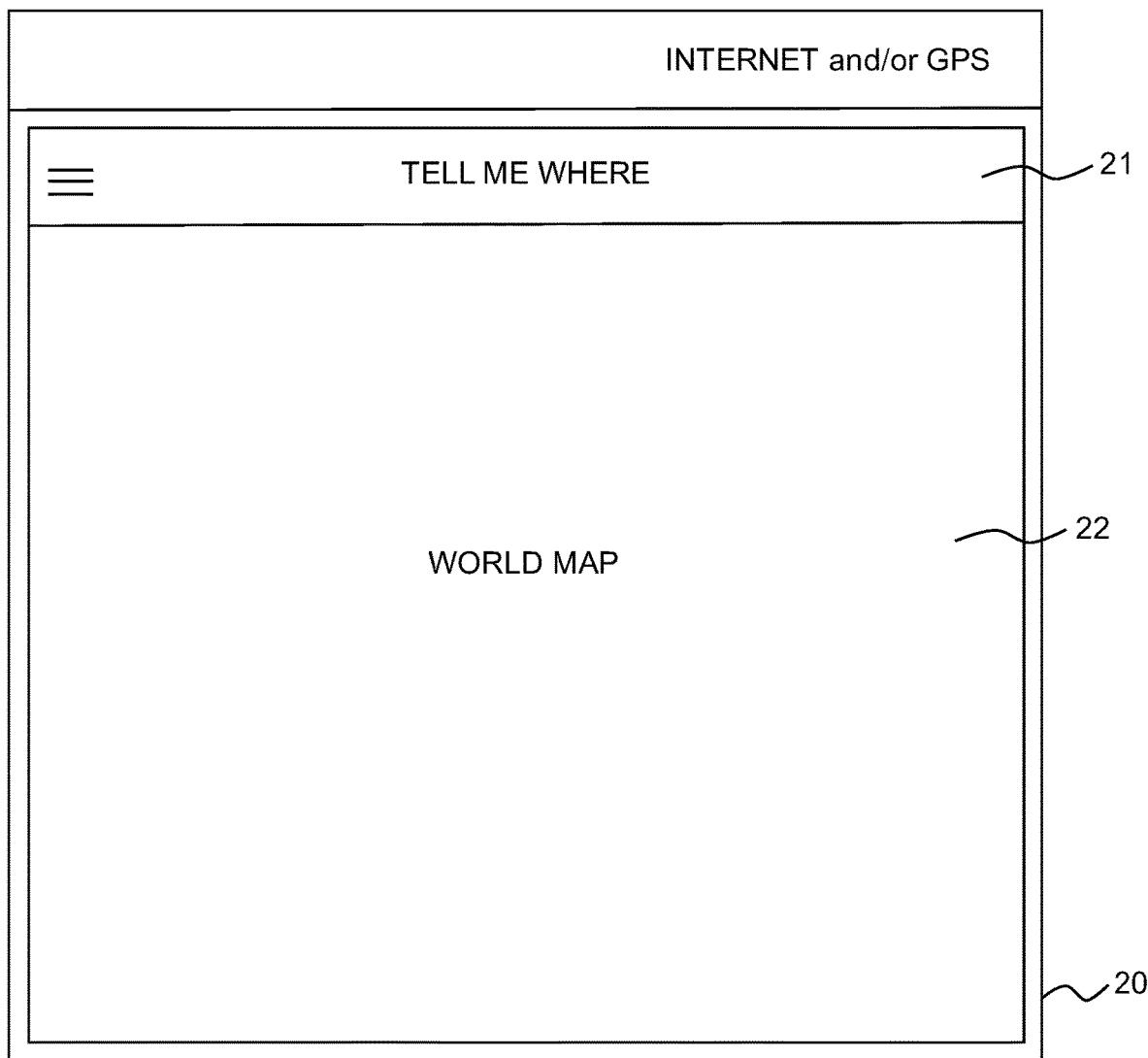
FIG. 2 is an example of a simplified device display of a first/landing screen of a locator module in accordance with an implementation.

FIG. 2 is a simplified example of a simplified landing screen display produced by locator module 14 on a display 20 of locator module 14 when a user first accesses the locator system. For example, the simplified device display includes a "tell me where" header 21 and a map 22.

Figure 3:
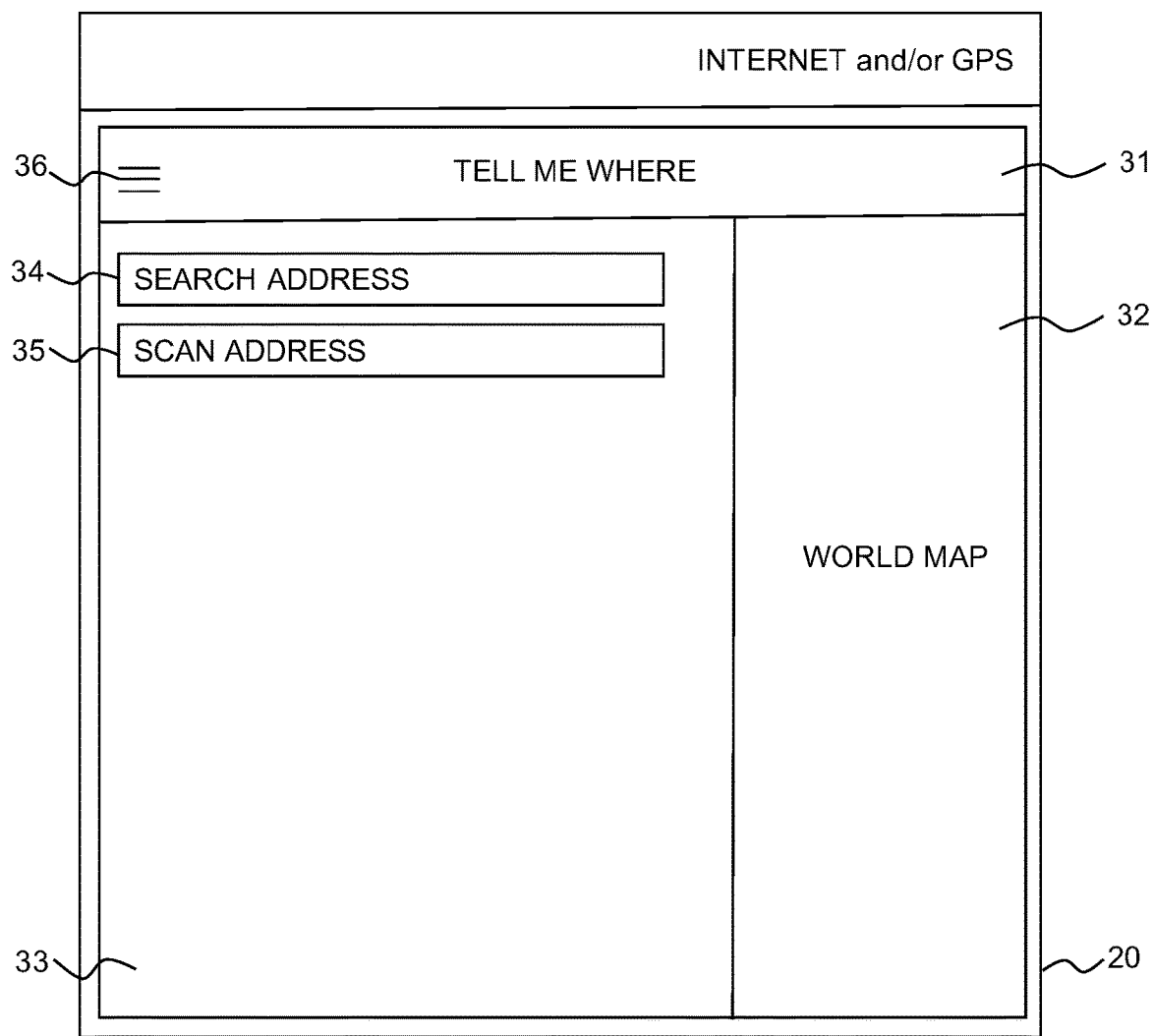
FIG. 3 is an example of a simplified device display that includes a search textbox in accordance with an implementation.

FIG. 3 is a simplified example of a simplified search screen display produced by locator module 14 on a display 20 of locator module 14 allowing user to search for property/venue along with an addressable subpart on the property. For example, the simplified device display includes a "tell me where" header 31, a map 32 and a search window 33 with a search address box 34 and a scan address box 35. A user can enter an address along with an addressable subpart in search address box 34. Button 36, having the appearance of three horizontal lines is accessible from the screens displayed by locator module 14 and allows access to the simplified search screen display.

In the example shown in FIG. 3, a search field for property receives user input by way of a textbox. Alternatively, for example, user input can be received via an autocomplete textbox, a pull-down selection menu and so on.

For example, user input is an address of an addressable subpart of a property. Such addressable subpart of an address may be variously formatted. For example, an address may have the following form: 123 Sample Ave #1569, City, State, Zip. Alternatively, an address may have the following form: 123 Sample Ave #001 City State Zip. Alternatively, an address may have the following form: 123 Sample Ave Unit 39 City State Zip. Alternatively, an address may have the following form: 123 Sample Ave Apt 45 City State Zip. These formats of address are exemplary, and may include other formats in addition to or instead of above mentioned exemplary formats.

For example, a search field allows a user to look up an addressable subpart of the property by address. Alternatively, or in addition, other search fields can be used by a user to look up an addressable subpart of a property. These other search fields can include, for example, a name of the property along with an addressable subpart identifier, or can make use of a scan address feature (illustrated by scan address box 35) so that a scanning feature within device 13 can be used to scan, for example, a barcode to obtain an address. Other search fields and methods can also be used.

Various formats may be used for a name of the property along with an addressable subpart. For example, a name of the property along with an addressable subpart identifier a name of the property may have the following form: The XYZ Apartments #1569, City, State, Zip. Alternatively, a name of the property along with an addressable subpart identifier a name of the property may have the following form: The XYZ Apartments #001 City State Zip. Alternatively, a name of the property along with an addressable subpart identifier a name of the property may have the following form: The XYZ Apartments Unit 39 City State Zip. Alternatively, a name of the property and an addressable subpart identifier may have the following form: The XYZ Apartments Apt 45 City State Zip. Alternatively, a name of the property along with an addressable subpart identifier a name of the property may have the following form: The XYZ Apartments APT 1005 City State. These formats of search by name of property along with addressable subpart is exemplary, and may include other formats in addition to or instead of above mentioned exemplary formats.

Based on search input, locator module 14 will display search results. For example, search criteria are sent via a database query to server 11. For example, in some cases a warning or cautionary note may be displayed either before or after results are shown.

Figure 4:
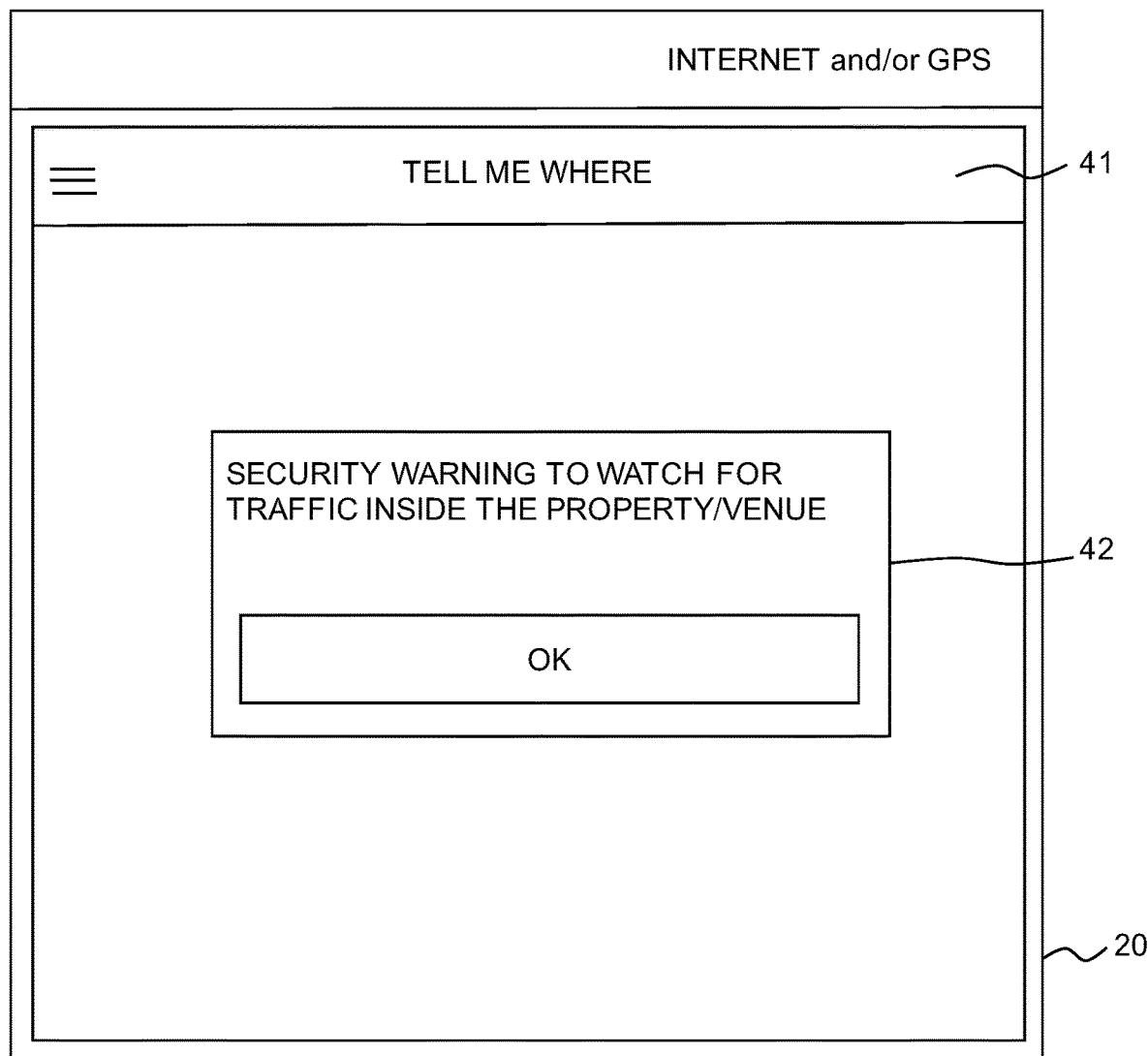
FIG. 4 is an example of a simplified device display providing a user warning or cautionary note in accordance with an implementation.

FIG. 4 is simplified device display illustrating where a warning or cautionary note is displayed to a user, for example, cautioning a user about traffic on internal roads of the property, uneven pavement, or some other hazard. For example, the simplified device display includes a "tell me where" header 41 and a warning or cautionary note message 42.

Figure 5:
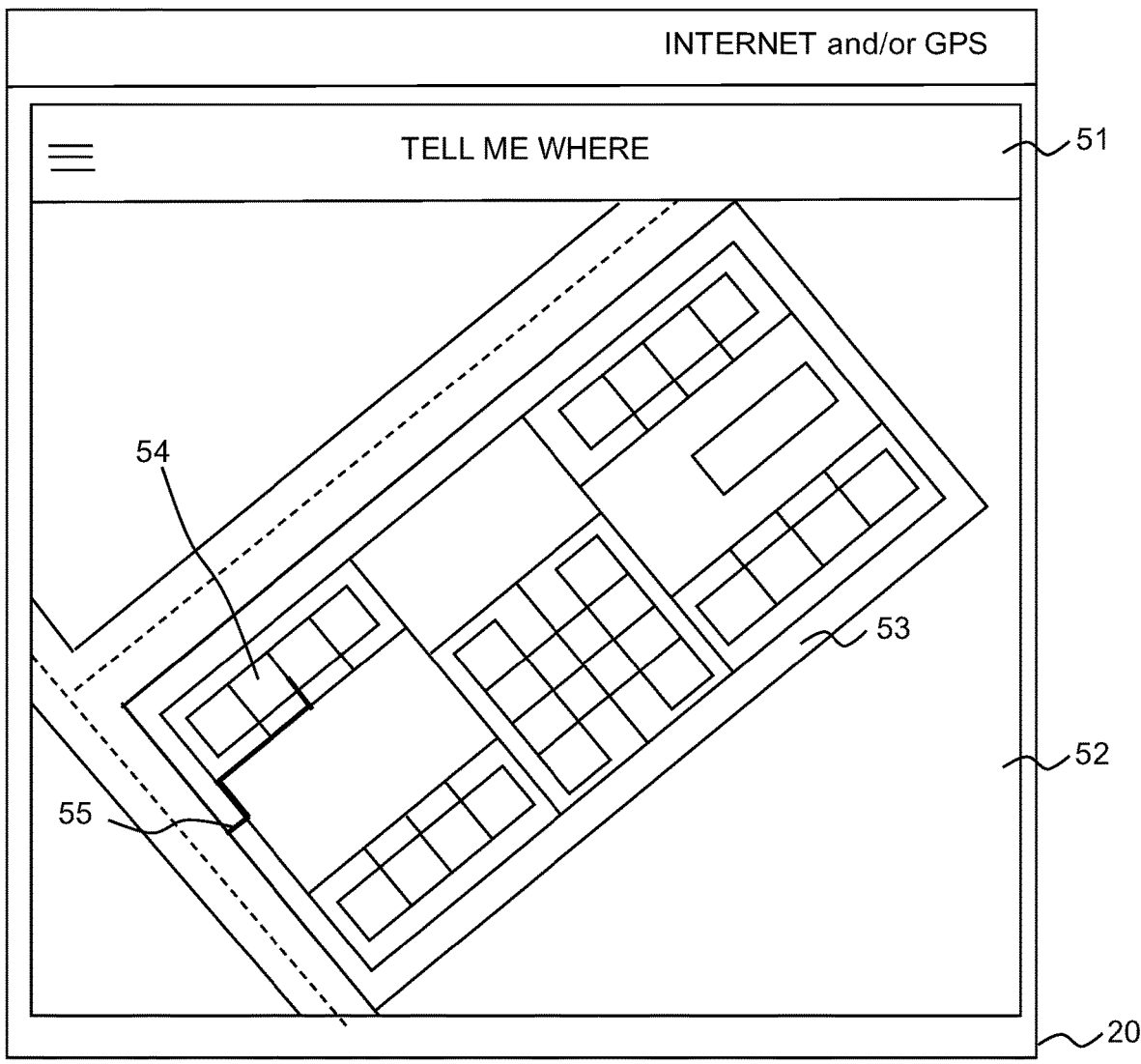
FIG. 5 is a simplified device display illustrating a sitemap of property with addressable subparts in accordance with an implementation.

An example of results based on a search request is shown in FIG. 5. FIG. 5 shows a results display produced by locator module 14 on display 20 of locator module 14. For example, the results display includes a "tell me where" header 51, a map area 52 and a site map 53. For example, sitemap 53 is produced using a format that uses geographic data structures such as the GeoJSON format. Sitemap 53 contains information such as, but not limited to, geometry, properties, and geographical coordinates of features on the property. The features in sitemap 53 may represent for example, but not be limited to, the geometry (shape) along with geographical coordinates of the addressable subparts, internal roads, landscape, swimming pool, etc. For example, the internal roads include walking paths. The results will also include geographical coordinates of path to the addressable subpart from the entrance of the property or the road. If the user has enabled location tracking, then the results may include geographical co-ordinates of path from user's current location to addressable subpart of the property.

The result of search query returned in site map 53 using GeoJSON format is exemplary. Results of search query can be returned in other GIS formats in addition to or instead of GeoJSON format.

For example, site map 53 includes a marker 54 to identify the user requested addressable subpart of the property along with a path 55 to the location of marker 54. For example, locator system displays sitemap 53 and marker 54 on a street map in a two-dimensional view. For example, additional information about the addressable subpart of the property is available if needed in a popup window accessible from the display shown on display 20.

For example, locator module 14 will re-center the display of site map 53 such that site map 53 is in the field of view of displayed by device 13. This re-center of display of sitemap is exemplary and may or may not be needed.

For example, when locator module 14 is located on a portable device, locator module 14 may request user for access to user's current location using GPS/network connection on the portable device. For example, if the user allows locator system to access user's current location, path 55 to the addressable subpart of property is displayed from the user's current location. If not, path 55 to the marked addressable subpart of the property will be displayed, for example, from an entrance of the property beginning, for example, from a point where a GPS map shows a location of the property.

For example, path 55 may include drivable and non-drivable areas. For example, non-drivable areas include a walkway or other non-drivable area. For example, drivable areas are displayed using an unbroken line and walkway will be displayed using dashes or dots. The differences between mode of display of drivable and non-drivable portions of the path are exemplary, and may include other forms of distinguishing features in addition to or instead of the examples given.

For example, when a user allows the locator system to access the user's current location, location module 14 will add a marker which shows progress as the user walks/proceeds along the path to a marked addressable subpart. This display of the user's current location along the path to the addressable subpart is exemplary and may or may not be included.

In FIG. 5, the display of additional information about addressable subpart of the property is exemplary. It may or may not be needed. The use of popup window to display additional information is also exemplary. Other types of information display like an Android toast message and so on may be used to display additional information about addressable subpart of property in addition to or instead of a popup window.

In FIG. 5, sitemap 53 is displayed on a street map 53 in a two-dimensional view; however, other types of views may be used instead or in addition, such as a three-dimensional view or a two-dimensional view with satellite imagery and so on.

For example, a log is maintained to identify and record information such as the user, date and time of requesting property location for the purpose of audit and analytics and so on.

The locator system requires accurate data about property that has an addressable subpart. The data collected about such properties includes, for example, information pertaining to the addressable subparts, and features including, but not limited to, swimming pool, tennis courts, recreation buildings, etc. For example, this data is collected using various techniques.

The information collected about the property used to create GIS ready sitemap 53 includes, for example, sitemap information in an image format such as portable network graphics (PNG) format (.png), JPEG format (.jpg or .jpeg), tagged image file format (TIFF, .tiff) WebP format (.webp) and so on. Image format is exemplary and may be used in addition to or instead of other formats, such as Adobe portable document format (PDF, .pdf) or in a computer-aided design (CAD) format, and so on.

For example, a sitemap is processed to create GIS ready sitemap in standard format such GeoJSON format or other standard or non-standard GIS format such as a vector GIS File format (e.g., SHP, KMZ/KML, GDB, MDB, LYR, OSM, ArcInfo Coverage, E00 ArcInfo Interchange, ArcSDE, GBF DIVE Post GIS+pstgreSql, SpatialLite, TIN), or a raster GIS Format (e.g., Esri Grid, GeoTiff). The GIS ready sitemap, for example, is stored in server 11 in the form of a database. For example, in response to a user request, stored data is displayed as shown in FIG. 5. While in the discussion below, examples are given using GeoJSON format, another other standard or non-standard GIS format, as listed above, may be used instead of GeoJSON format depending on a particular implementation.

Based on search input, locator module 14 will display search results. For example, search criteria are sent via a database query to server 11.

For example, in some implementations, a user is required to register or establish a mode of payment before results are displayed as in FIG. 5. The mode payment may be monetary or involve other forms of "payment" such as performing "like" or "tweet" on social media in addition to or instead of monetary mode of payment.

Figure 6:
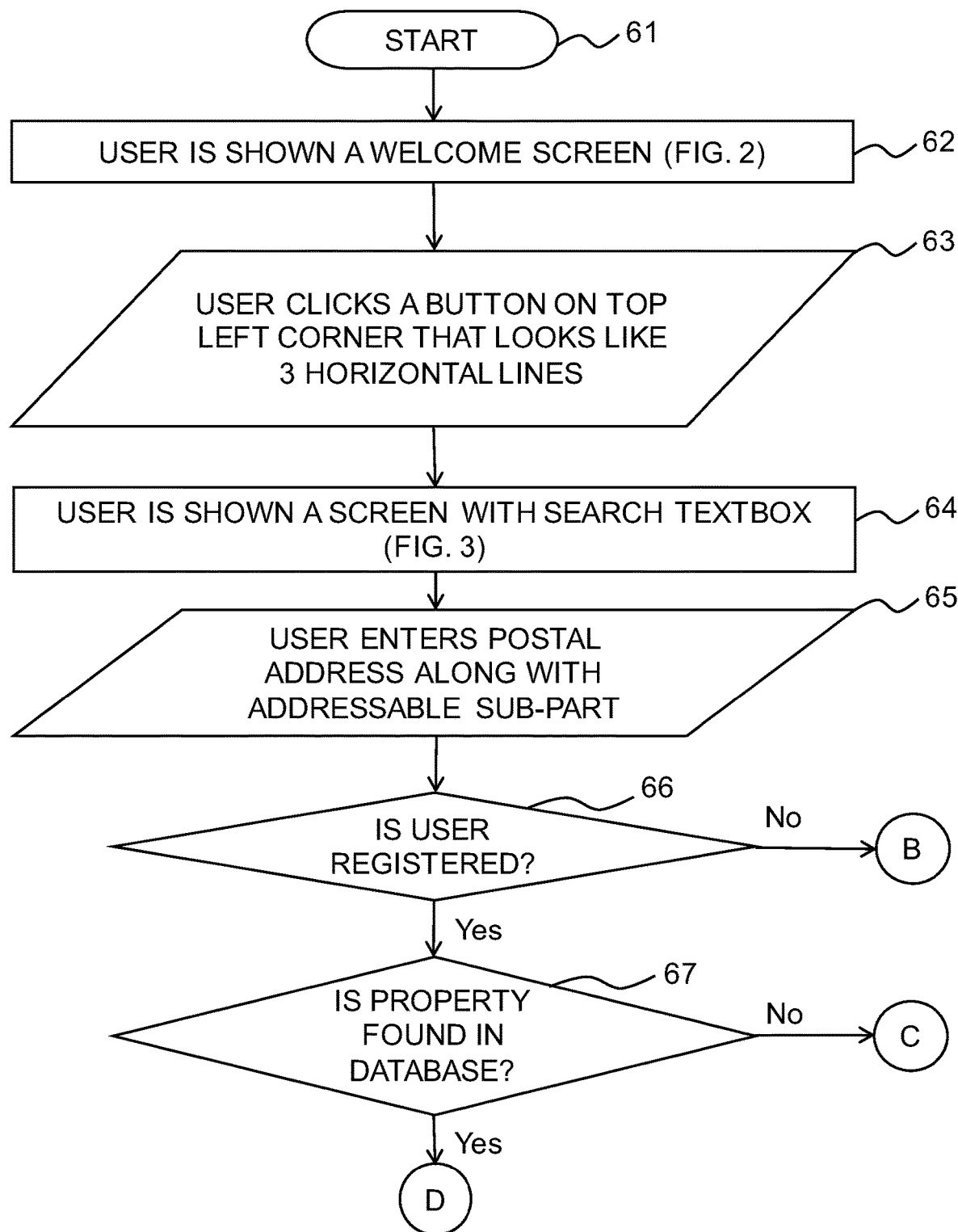
FIG. 6, FIG. 7 and FIG. 8 are a flowchart illustrating user experience in using a locator system in accordance with an implementation.
Figure 7:
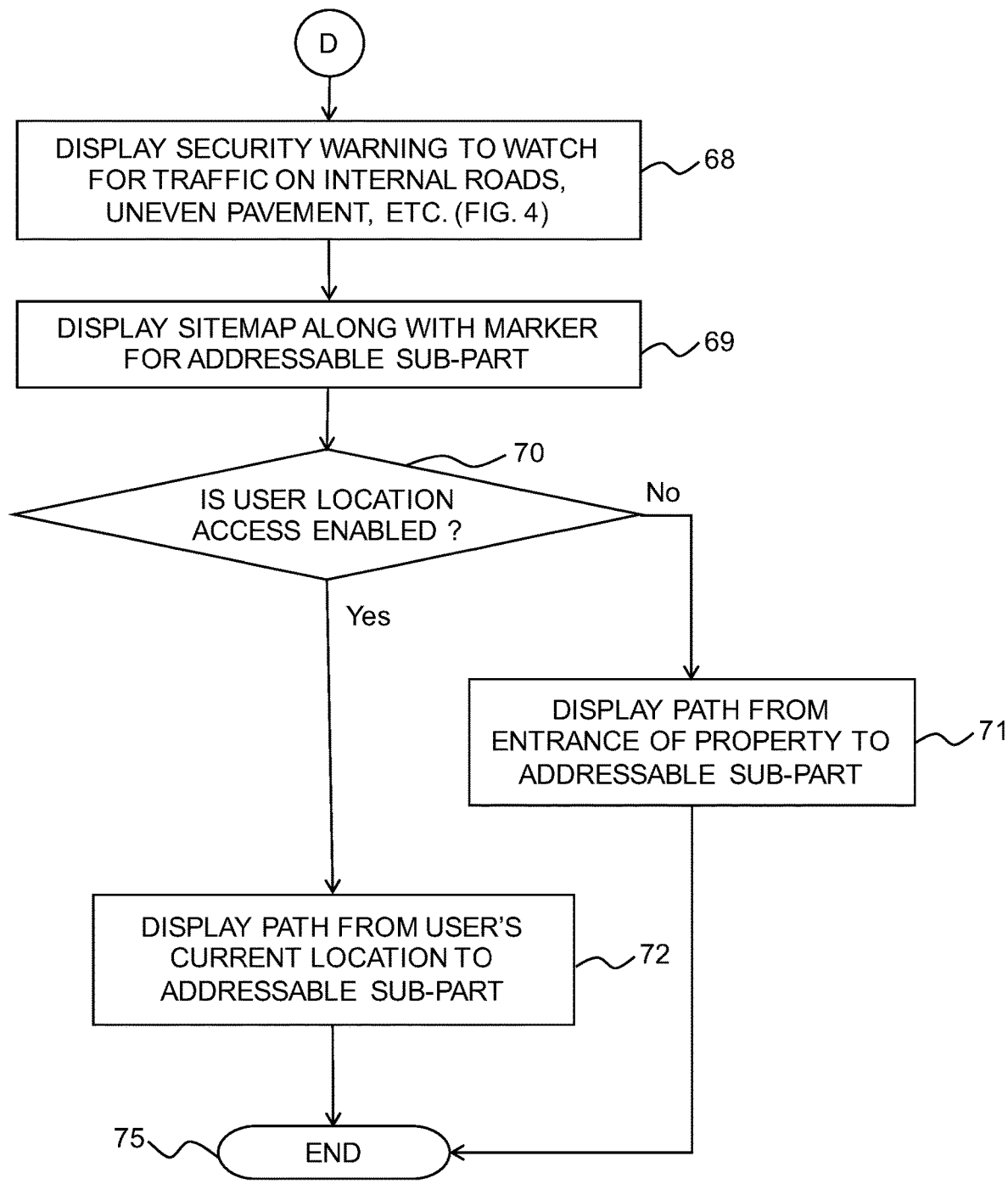
Figure 8:
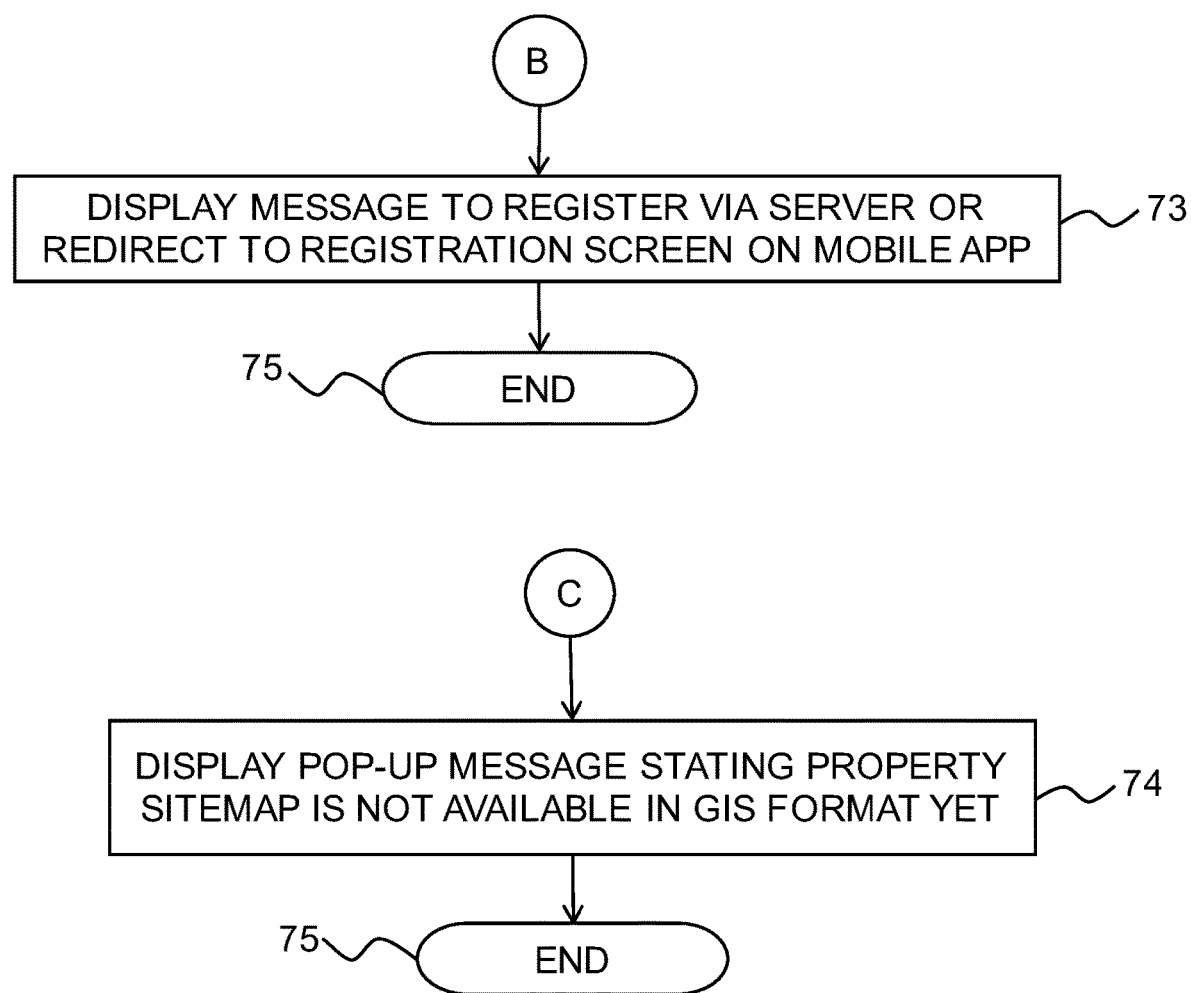

FIG. 6, FIG. 7 and FIG. 8 are a flowchart summarizing the user experience in using a locator system as described above. In a block 61, the process starts. In a block 62, the user is shown a welcome screen. In a block 63, the user clicks a button to access a search interface. In a block 64, the user is shown a screen with a search text box. In a block 65, the user enters a postal address along with an addressable subpart. In a block 66, a check is made to determine whether the user is registered. If not, in a block 73, a message is displayed instructing the user to register via server 11 or the user is redirected to a registration screen provided by locator module 14. In a block 75, the process ends.

If in block 66 the check indicates the user is registered, in a block 67 a check is made to determine whether the property is in a database on server 11. If the property is not in the database on server 11, in a block 74, a pop-up message is displayed that states a property sitemap is not available yet for the addressable subpart. In a block 75, the process ends. The use of popup window to display message is exemplary. Other types of information display like an Android toast message and so on may be used to display message in addition to or instead of a popup window.

If in block 66, the property is in the database on server 11, in a block 68, a security warning or cautionary note is displayed, for example, warning or cautionary note a user to watch for a hazard such as traffic on internal roads or uneven pavement. In a block 69, a sitemap is displayed along with a marker identifying the addressable subpart. In a block 70 a determination is made as to whether the user location access feature is enabled. If the location is not enabled, in a block 71, a display path from the entrance of the property to the addressable subpart is displayed.

If in block 70 the location is enabled, in a block 72, a display path from the user's current location to the addressable subpart is displayed. In a block 75, the process ends.

Figure 9:
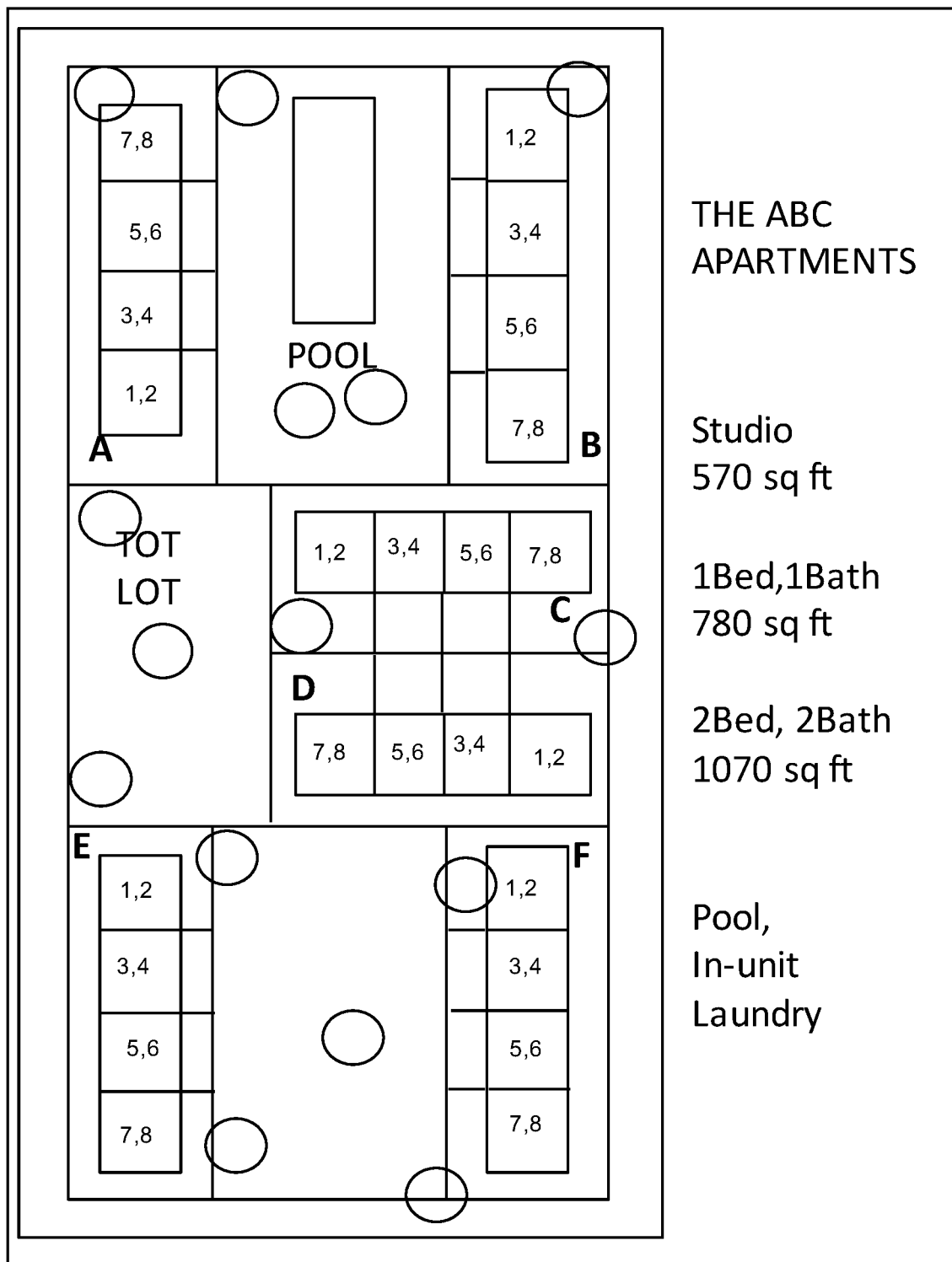
FIG. 9, FIG. 10 and FIG. 11 illustrate changes to a sitemap during generation of a geographic information system (GIS) ready sitemap in accordance with an implementation.
Figure 10:
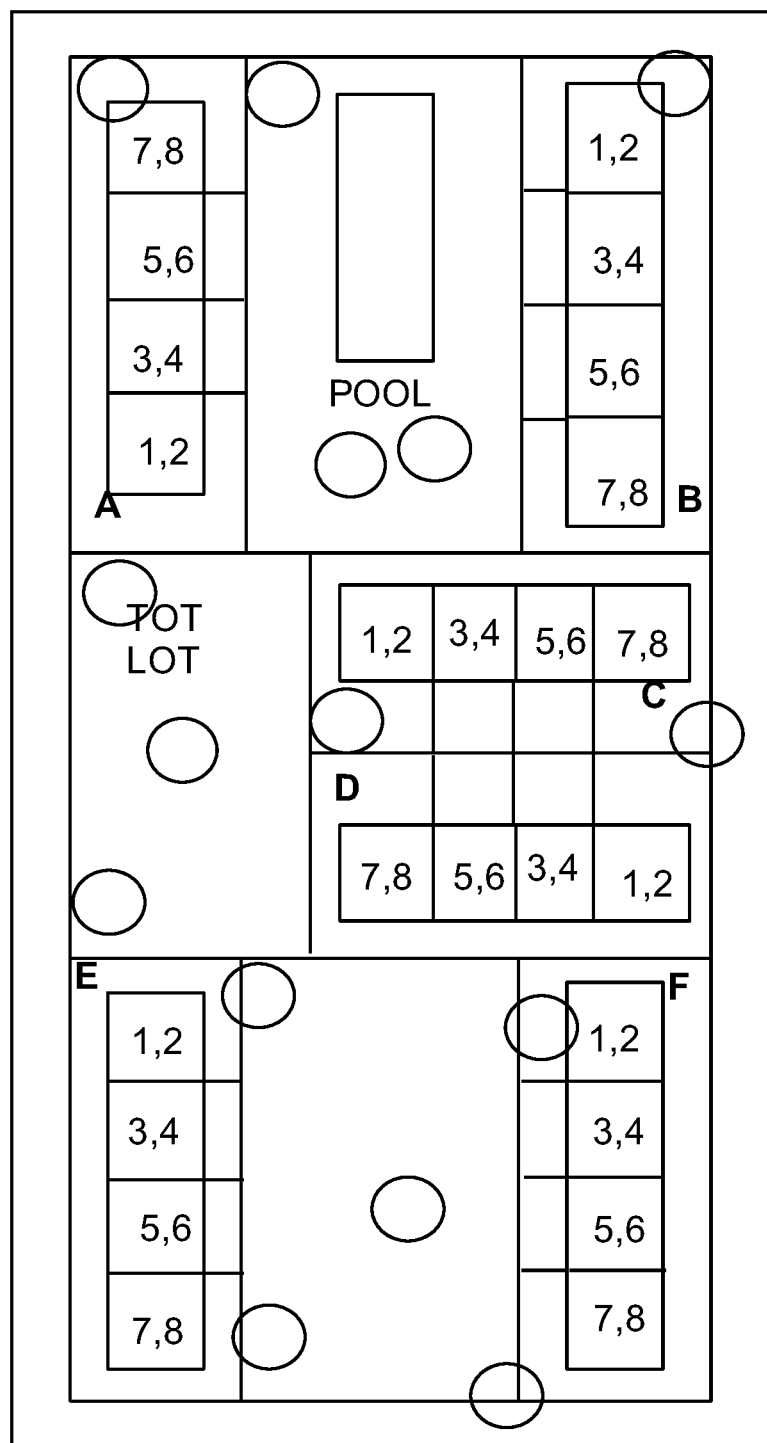
Figure 11:
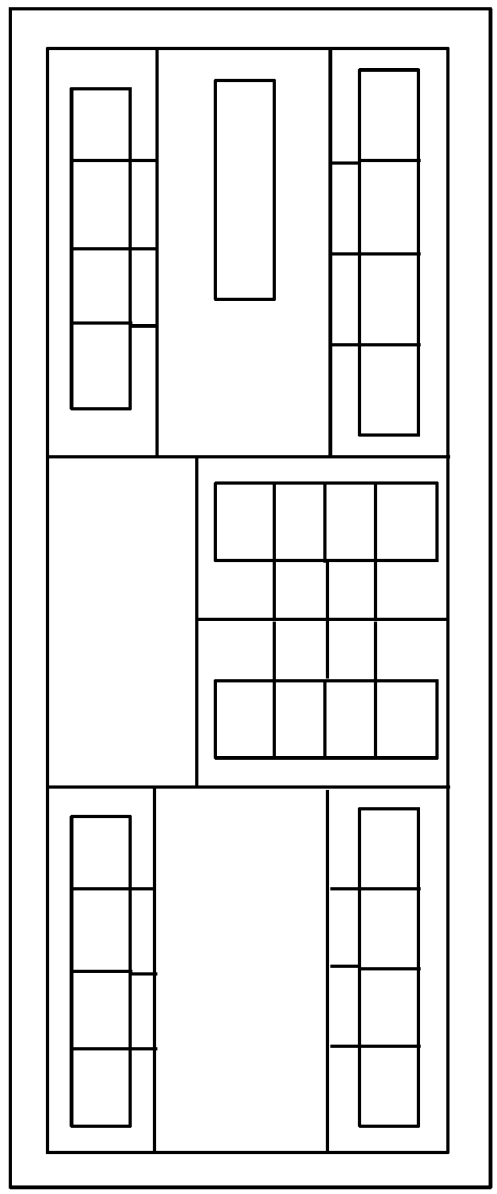

FIG. 9 is a sample sitemap that shows building, paths, greenery areas, a playground, internal roads (including walking paths) and trees (represented as circles). FIG. 10 and FIG. 11 illustrate changes to the sitemap when generating a GIS ready sitemap.

FIG. 12, FIG. 13, FIG. 14, FIG. 15, FIG. 16, FIG. 17, FIG. 18, FIG. 19, FIG. 20, FIG. 21 and FIG. 22 are a flowchart illustrating the generation of GIS ready sitemap. The process of generating GIS ready sitemap uses a sitemap image of a property that has multiple addressable subparts such as that shown in FIG. 9. The sitemap image can be in any image format such as, for example, PNG, JPEG format, TIFF, WebP format, PDF, a CAD) format and so on.

The GIS ready sitemap and its generation process is useful when a GPS map provides location of a property that has multiple addressable subparts, but does not show internal details of such properties like location of addressable subparts and a path to it. In this case, the GPS map can navigate the user only up to the entrance of such properties, but not thereafter to the addressable subpart itself. The locator system described herein provides the details of such properties. It can also provide direction from the entrance of the property up to the addressable subpart itself. Hence, the locator complements existing GPS maps by providing directions for addressable subparts within a property.

For example, a list of properties with addressable subparts is stored in a database on server 11. For each such property, server 11 stores a sitemap, location of addressable subparts, walkways on the property, and so on in a GIS format.

The process of generating GIS ready sitemap puts in one place information from multiple sources. The information includes, for example, a sitemap, publicly available GIS data, and so on.

Figure 12:
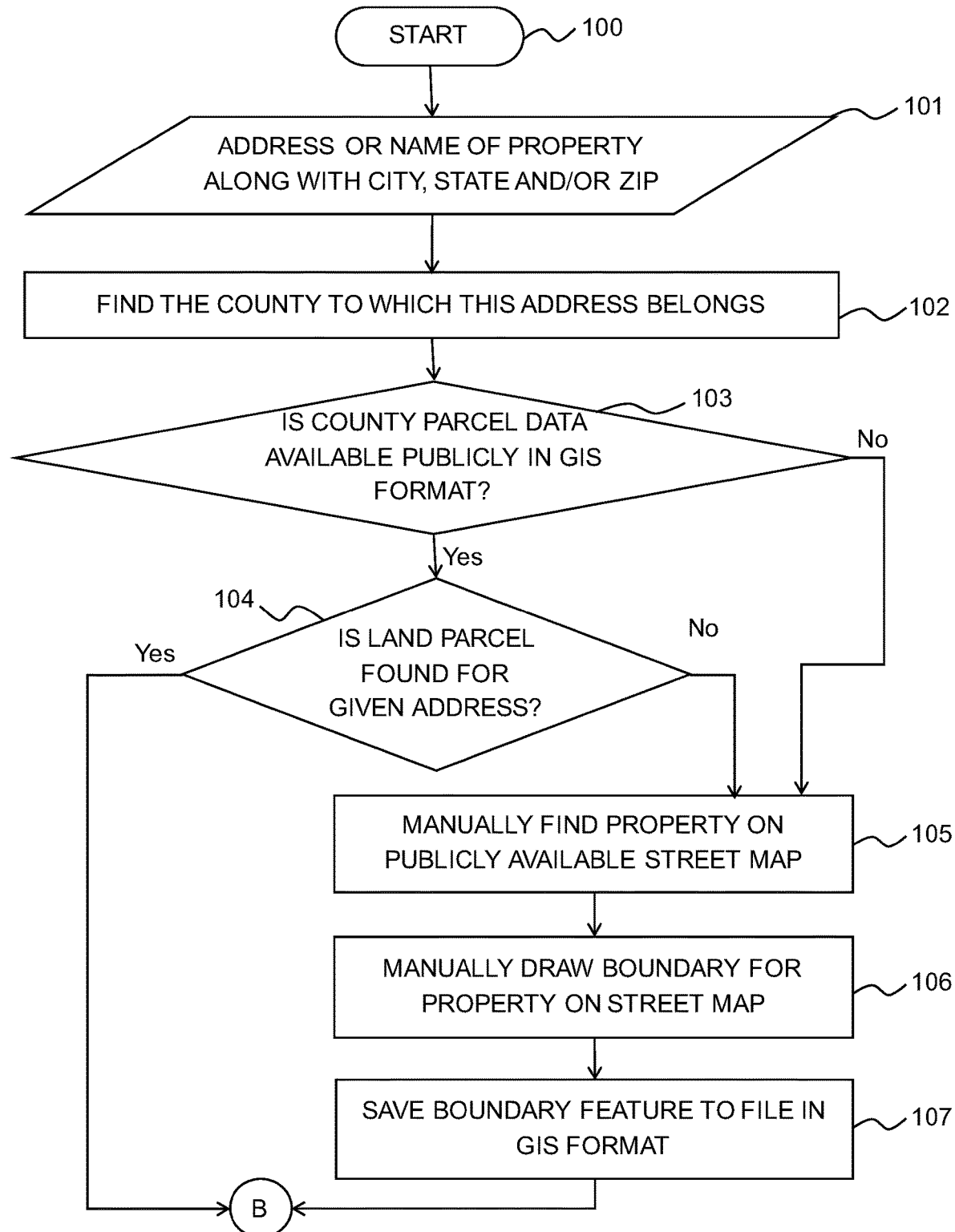
FIG. 12, FIG. 13, FIG. 14, FIG. 15, FIG. 16, FIG. 17, FIG. 18, FIG. 19, FIG. 20, FIG. 21 and FIG. 22 are a flowchart illustrating generation of GIS a ready sitemap in accordance with an implementation.

In FIG. 12, a block 100 depicts starting of the process of generating information about a property in GIS format. In a block 101, address of a property or its name along with city, state and/or zip is taken as input. In a block 102, the county to which the given property belongs is found. Land parcel data is publicly available for most counties in GIS format. If in a block 103, county land parcels data in GIS format is not available, or if in block 103, county land parcels data in GIS format is available but in a block 104 a land parcel is not found for the given address, then a manual intervention is needed. In a block 105, the given property on publicly available street map is found. In a block 106, boundary for property land parcel is manually drawn on a street map and in a block 107, the boundary information is saved in a GIS file format with a file name such as, for example, "boundary GIS file". The boundary information is boundary data that shows boundaries of the property in a geospatial format. If in a block 103, county land parcels data in GIS format is available and in a block 104, land parcel is found for the given address then continue process of generating information about a property in GIS format as mentioned in FIG. 13.

Figure 13:
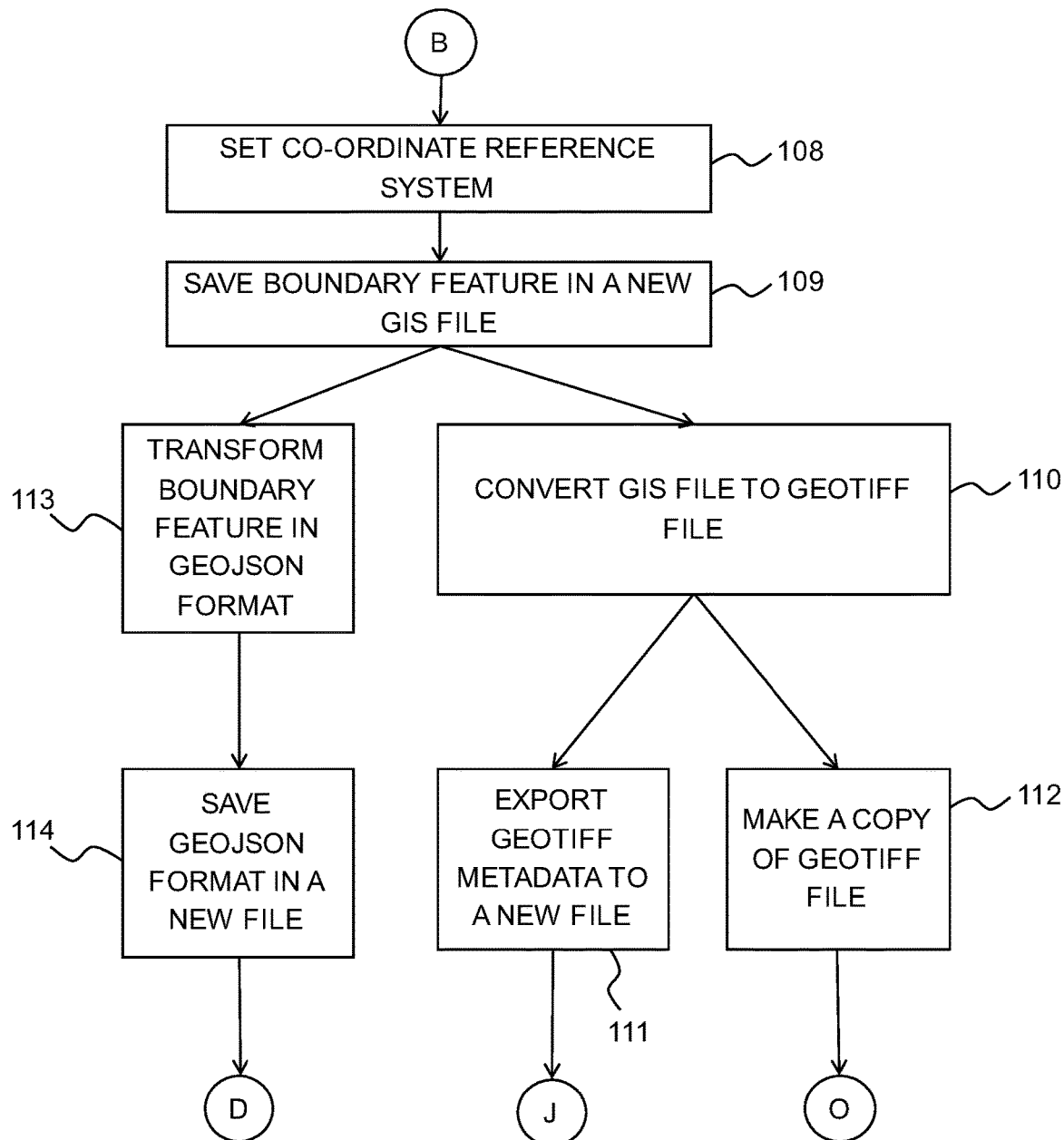

FIG. 13 depicts continuation of the process of generating information about property in GIS format. In a block 108, the co-ordinate reference of the land parcel GIS file is set to an appropriate co-ordinate reference system. In a block 109, boundary feature is saved to a new file in GIS format with a name such as, for example, "boundary_updated_crs file".

The file "boundary_updated_crs file" is transformed into two formats, one being GeoJSON format as in a block 113, and other being GeoTIFF image format as in a block 110. The GeoTIFF image format is saved to a new file, with a name, such as, for example, "boundary tiff file". For example, the boundary tiff file includes geospatial metadata that pertains to the boundary data for the property. In a block 114, the GeoJSON format is saved to a new file with a name such as, for example, "boundary GeoJSON file". In a block 112, a copy of "boundary TIFF file" from step 110 is made and saved with a name such as, for example, "boundary tiff file copy". In a block 111, metadata of GeoTIFF image file is saved to a new file with a name, for example, "metadata tiff file".

Figure 14:
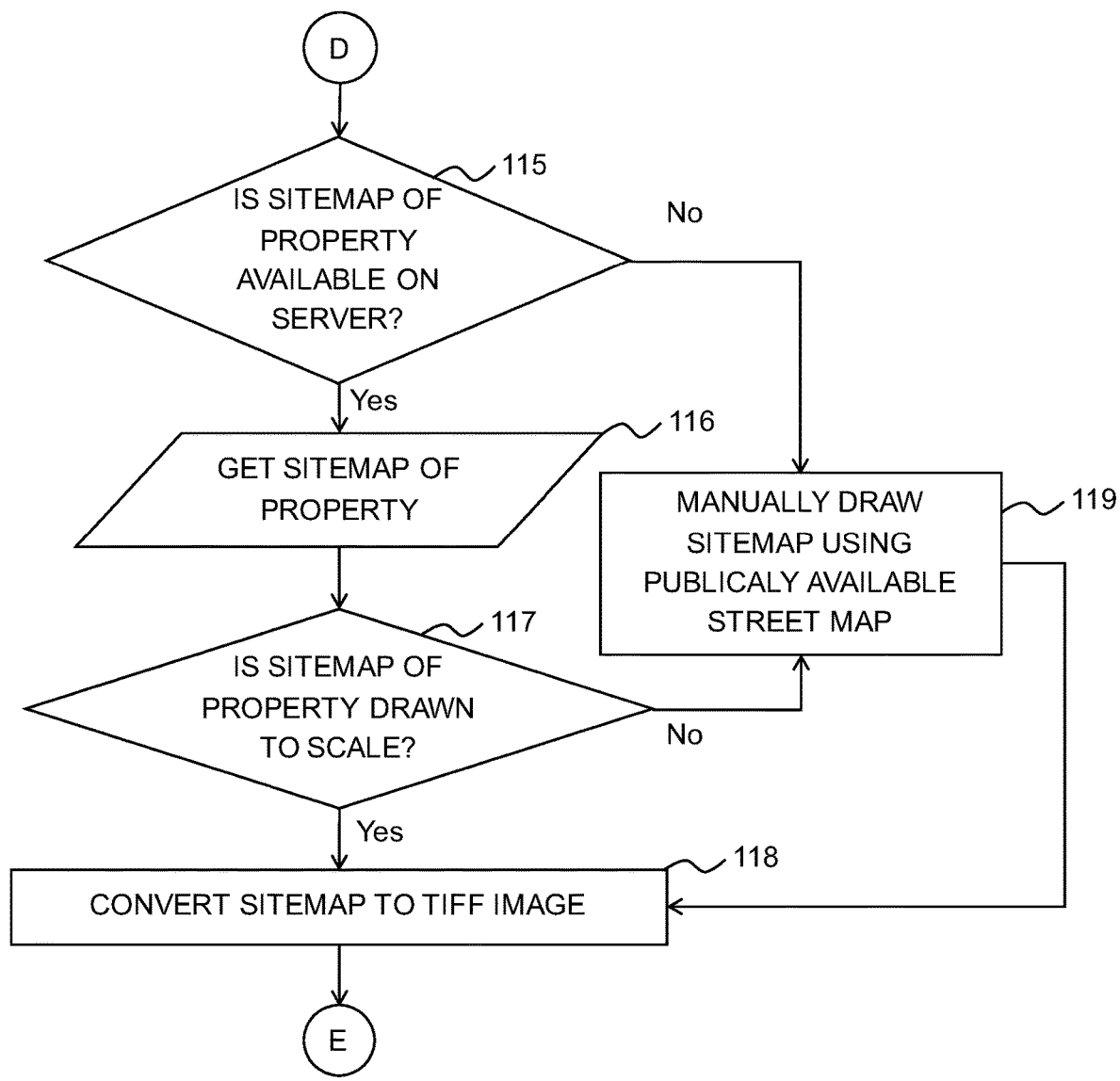

FIG. 14 depicts continuation of the process of generating information about property in GIS format. If in a block 115 a sitemap is available for such property on the server, the sitemap is obtained in a block 116. In a block 117, if sitemap is drawn to scale then in a block 118, the sitemap is converted to a TIFF image and saved to a new file. In a block 115, If the sitemap is not available or in a block 117, the sitemap is not drawn to scale, then manual intervention is needed. In a block 119, a publicly available street map is used to manually draw a sitemap and then in a block 118, sitemap is converted to a TIFF image and saved to a new file.

Figure 15:
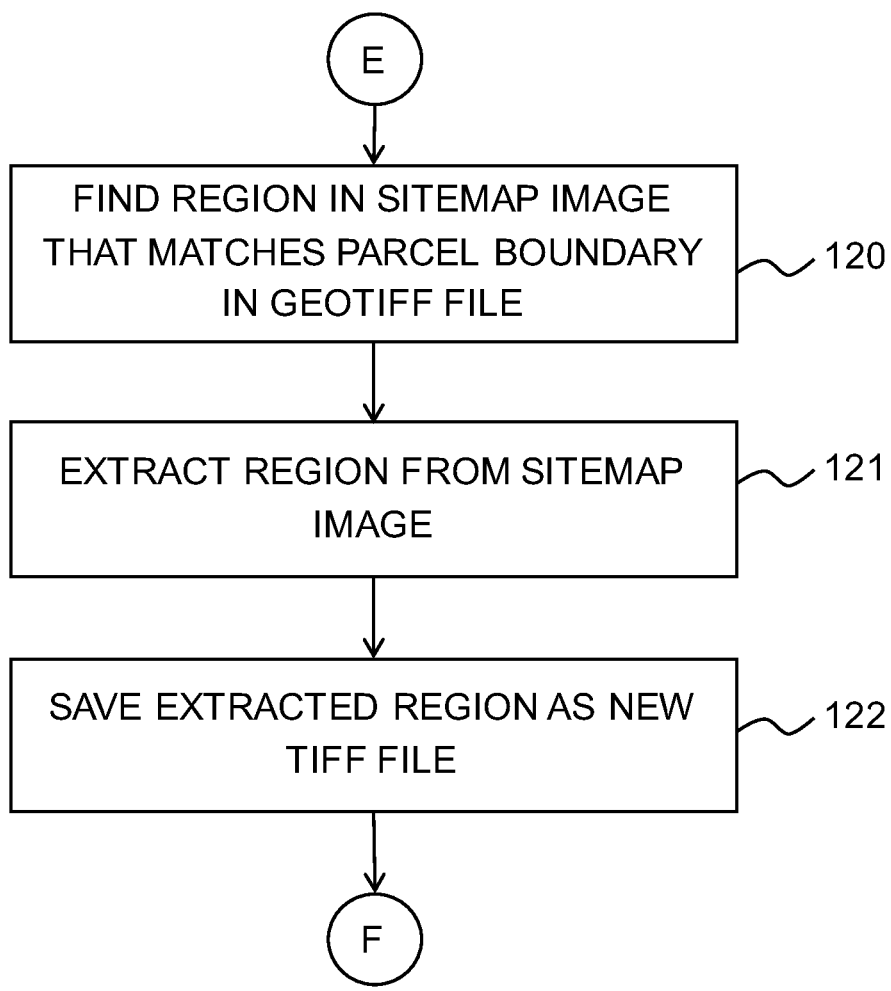

FIG. 15 depicts continuation of the process of generating information about property in GIS format. Sitemap image may contain more data than just the property and its internal details like building, water area, walkways, etc. For example, a sample sitemap is shown in FIG. 9. In a block 120, the region in the sitemap image that matches the land parcel boundary in the "boundary tiff file" from step 112, is found. In a block 121, that region from sitemap image is extracted. In a block 122, extracted region is saved as a new TIFF image file with a name such as, for example, "sitemap clipped" TIFF file. For example, the result is shown in FIG. 10.

Figure 16:
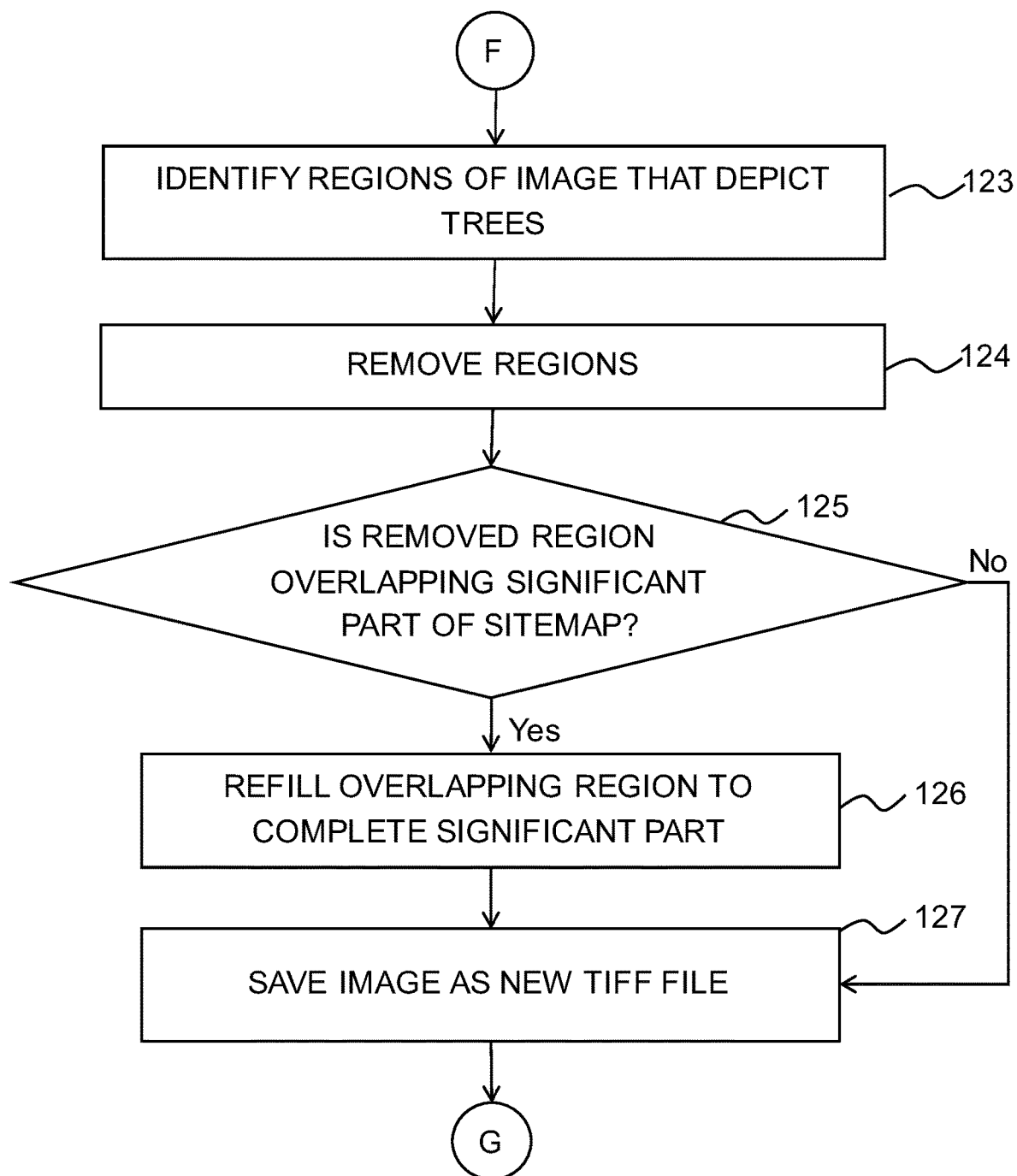

FIG. 16 depicts continuation of the process of generating information about property in GIS format. In a block 123, regions that depict trees in the "sitemap clipped" TIFF file are identified. In a block 124, those regions are removed. If in a block 125, the removed region overlaps other features on the sitemap like, for example, building, walkway, and so on, then in a block 126 the overlapping/clipped regions are refilled to complete significant parts of the sitemap image. Significant parts are, for example, buildings, walkways, water areas, green or grass areas and internal roads. The result, in a block 127, is saved as a new TIFF image file with a name such as, for example, "sitemap no trees". For example, the resulting image is shown in FIG. 11. If in a block 125, the removed region does not overlap other features on the sitemap then in a block 127, save it as a new TIFF image file with a name such as, for example, "sitemap no trees".

Figure 17:
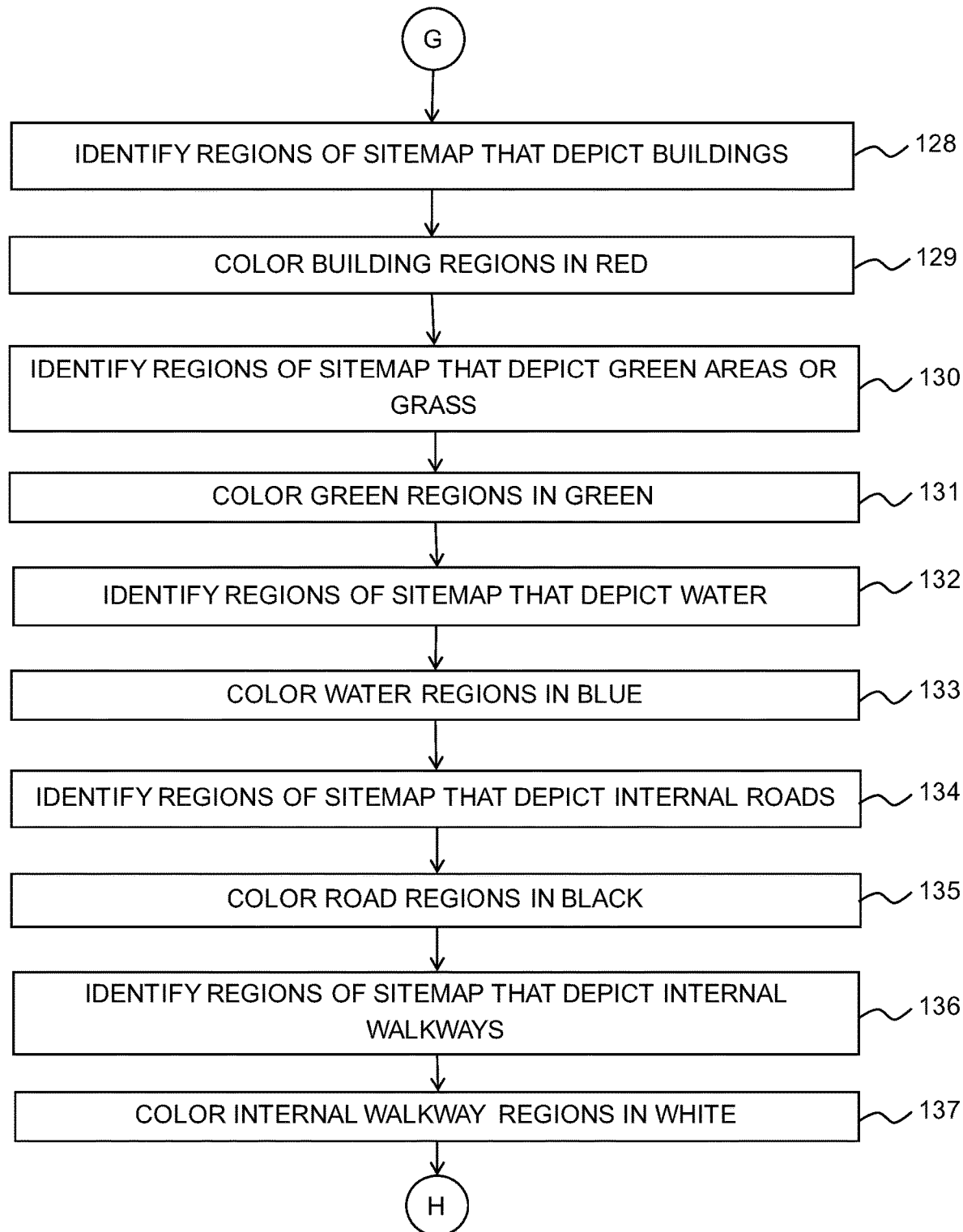

FIG. 17 depicts continuation of the process of generating information about property in GIS format to identify significant parts of sitemap image and fill those with particular colors. For example, in a block 128, regions of sitemap image that depict buildings are identified and in a block 129 filled in with red color. In a block 130, regions of sitemap image that depict green or grass areas are identified and in a block 131 are filled with green color. In a block 132, regions of sitemap image that depict water areas are identified and in a block 133 are filled with blue color. In a block 134, regions of sitemap image that depict internal roads and/or parking lot are identified and in a block 135 are filled with black color. In a block 136, regions of sitemap image that depict internal walkways are identified and in a block 137 are filled with white color.

Figure 18:
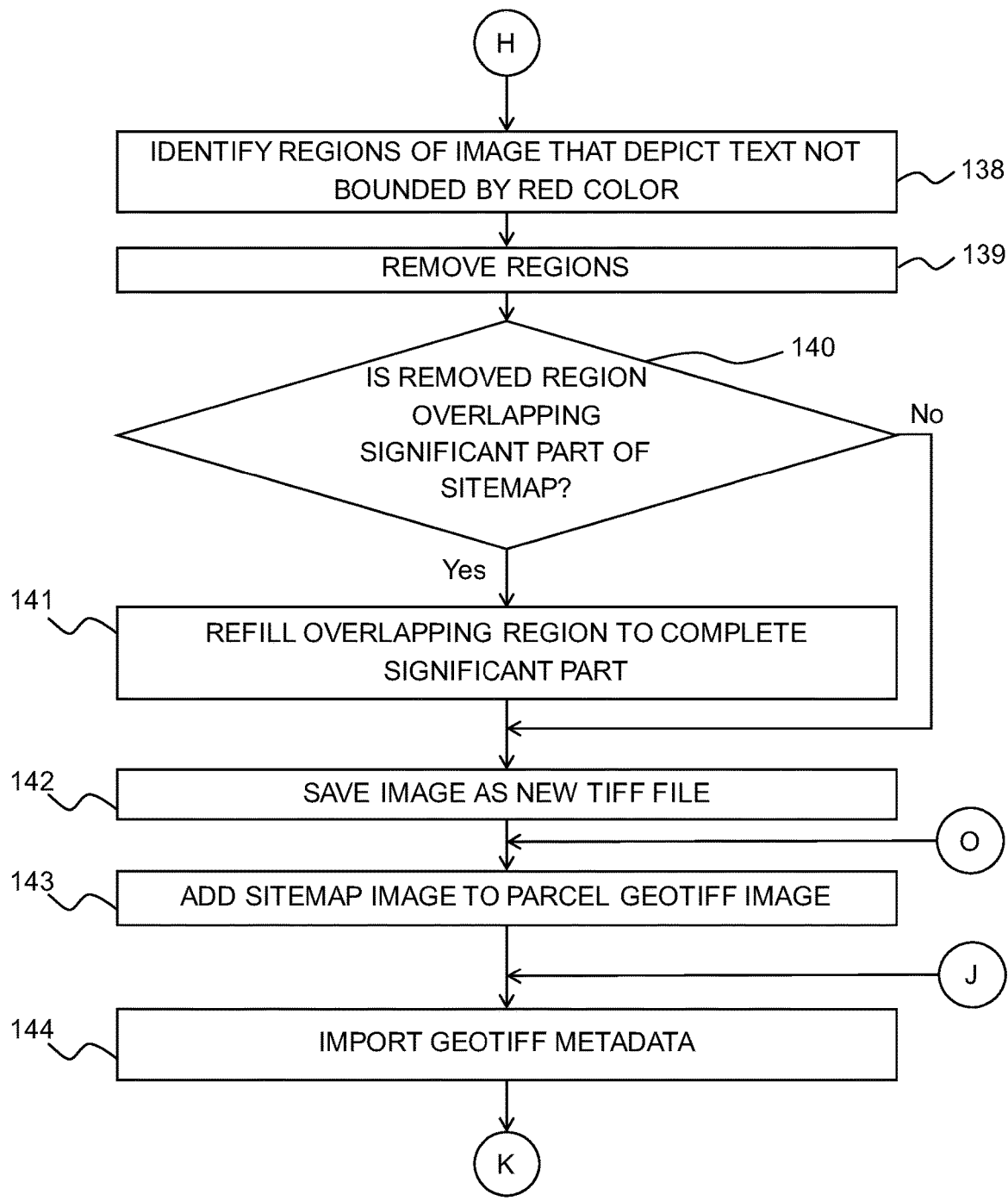

FIG. 18 depicts continuation of the process of generating information about property in GIS format. In a block 138, regions of sitemap image are identified that depict text not bounded by red color. In a block 139, those regions are removed. If in a block 140, the removed regions are overlapping other features on the sitemap like, for example, building, walkway, and so on, then in a block 141, the overlapping/clipped regions are refilled to complete significant parts of the sitemap image. In a block 142, the resulting image is saved as a new TIFF image file with a name such as, for example, "sitemap removed text" TIFF file. If in a block 140, the removed regions are not overlapping other significant features on the sitemap then process step 142. The result is shown for example, in FIG. 11. In a block 143 the "sitemap removed text" image is added to land parcel image called "boundary tiff file copy" from step 112 such that it fits within the boundary in land parcel image. In a block 144, the GeoTIFF metadata is added from the "metadata tiff file" from step 111.

Figure 19:
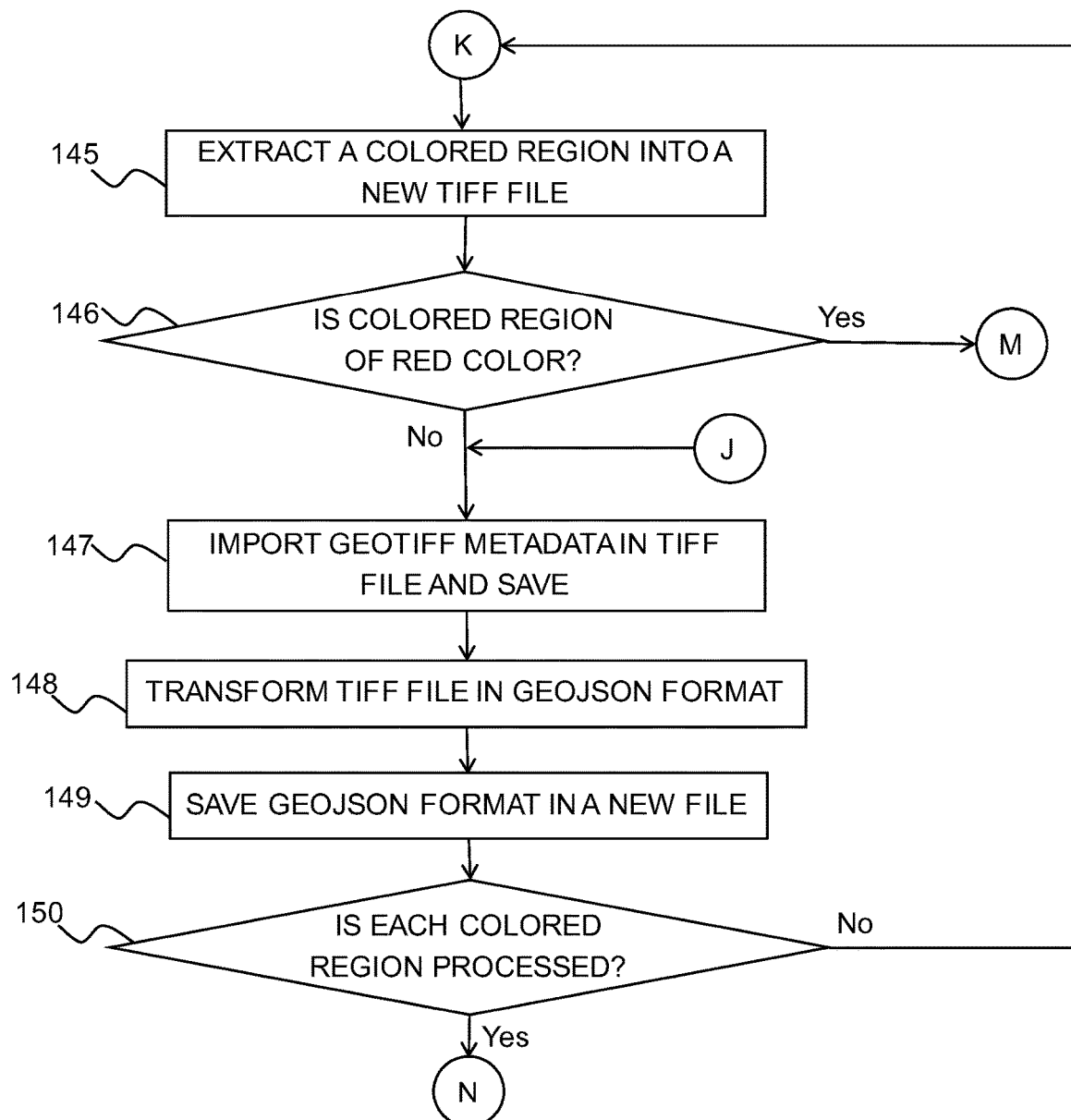

FIG. 19 depicts continuation of the process of generating information about property in GIS format. FIG. 19 describes a process of extracting each colored region and converting it into GeoJSON format. The process is continued until all colored regions are processed. For example, in a block 145, a particular colored region is extracted into a new TIFF file. If in a block 146, the region is not a red color, then in a block 147, GeoTIFF metadata from "metadata tiff file" from step 111 is imported into TIFF file created in a step 145. In this way, geospatial metadata from a boundary image file is associating with the region, where the geospatial metadata from the boundary image file provides geospatial information pertaining to the region. In a block 148, the TIFF file from step 147 is transformed into GeoJSON format and in a block 149 the GeoJSON format is saved as a new GeoJSON file. If In a block 150, each colored region is not processed, then steps 145 to 149 are repeated.

Figure 20:
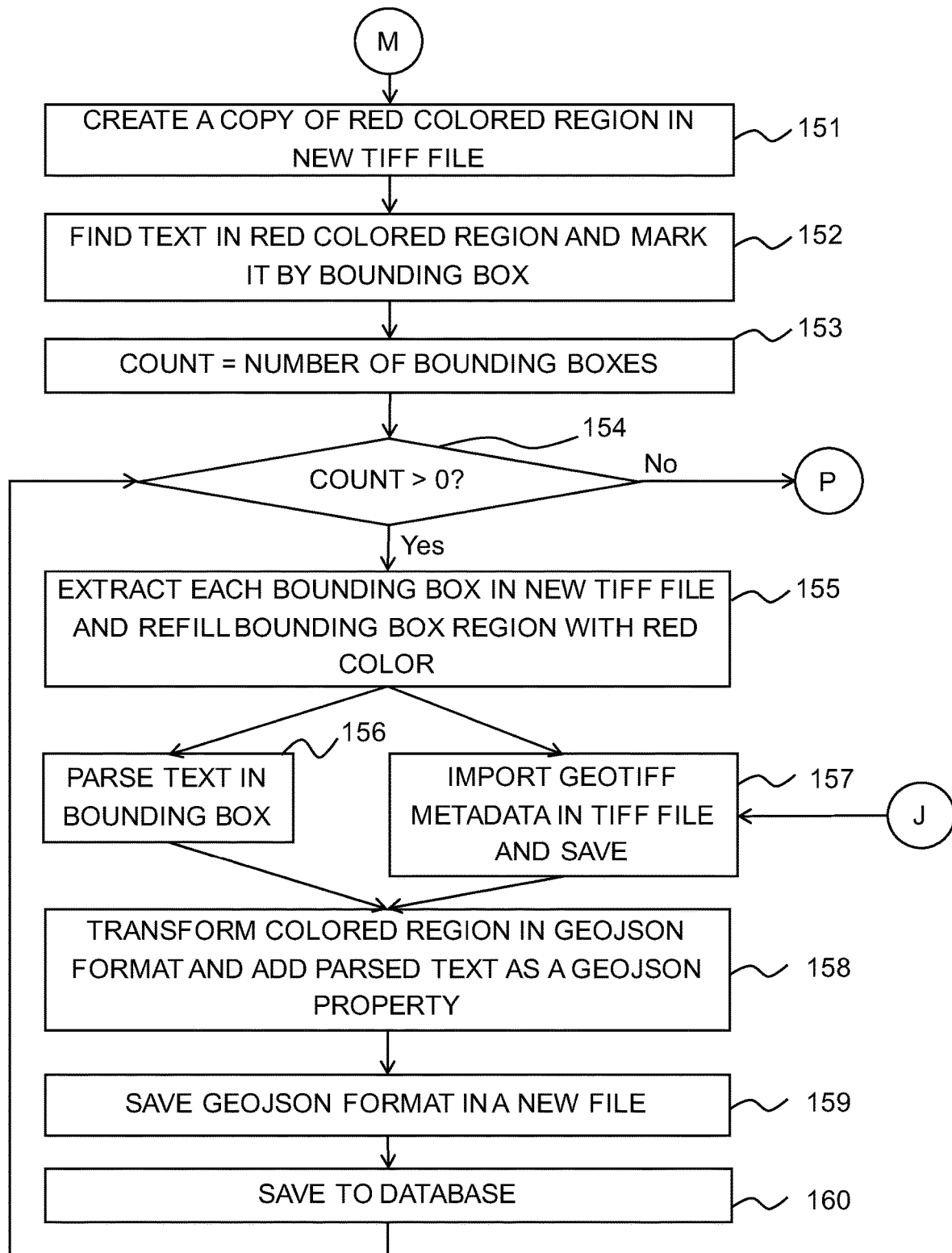

FIG. 20 depicts continuation of the process of generating information about property in GIS format. For red colored region in a block 151, a copy of TIFF file from step 145 is created and saved as a new TIFF file. In a block 152, text bounded by the red colored region is found and marked with a bounding box around the text. For example, the text bounded by the red colored region is used as addressing information for the region. This allows addressing information that pertains to the region to be associated with the region as metadata.

In a block 153 and a block 154 a count of the number of such bounding boxes marked is kept. For each marked bounding box, in a block 155, the bounding box is extracted and saved to a new TIFF file and bounding box region is refilled with red color in TIFF file from step 152. In a block 156, the text in bounding box is parsed. In a block 157, GeoTIFF metadata from "metadata tiff file" from step 111 is imported into TIFF file created in a step 155 and saved. In a block 158, the resulting TIFF file saved in a step 157 is transformed into GeoJSON format and parsed text from step 156 is added as GeoJSON property. In a block 159, GeoJSON format is saved in a new file. In a block 160, GeoJSON format is saved in a new file and in the database in server 11. This process is repeated until all bounding boxes are processed.

Figure 21:
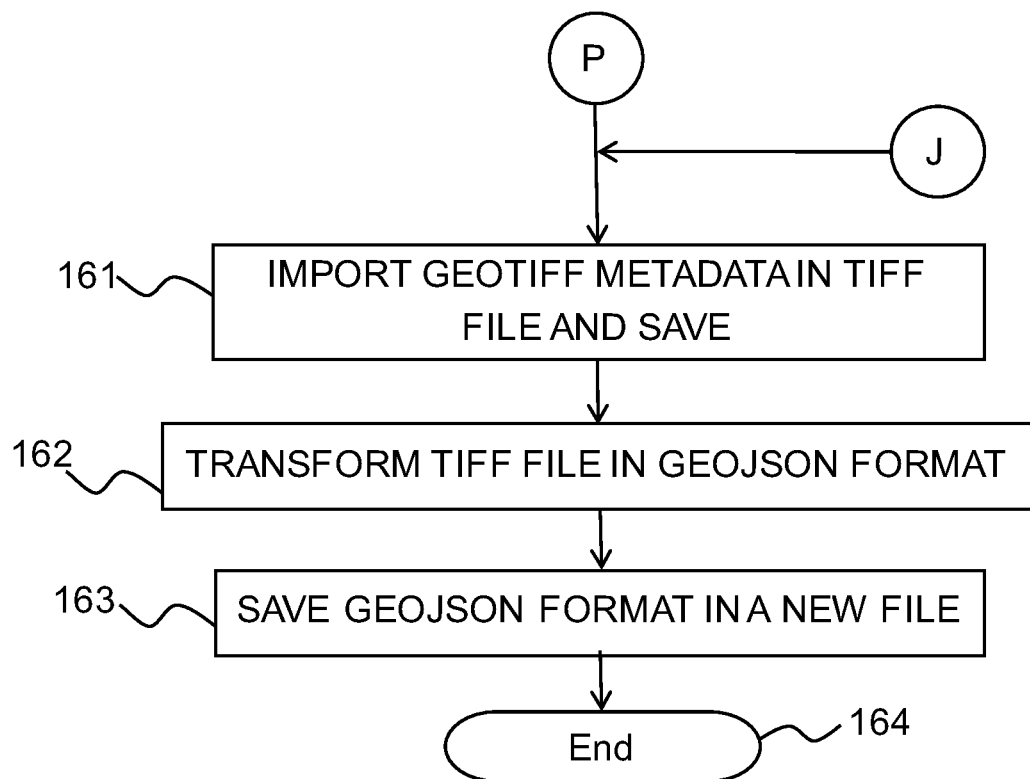

FIG. 21 depicts continuation of the process of generating information about property in GIS format. In a block 161, GeoTIFF metadata from "metadata tiff file" from step 111 is imported into TIFF file created in a step 151 and saved. In a block 162, the TIFF file from step 161 is transformed into GeoJSON format and in a block 163 the GeoJSON format is saved as a new GeoJSON file.

Figure 22:
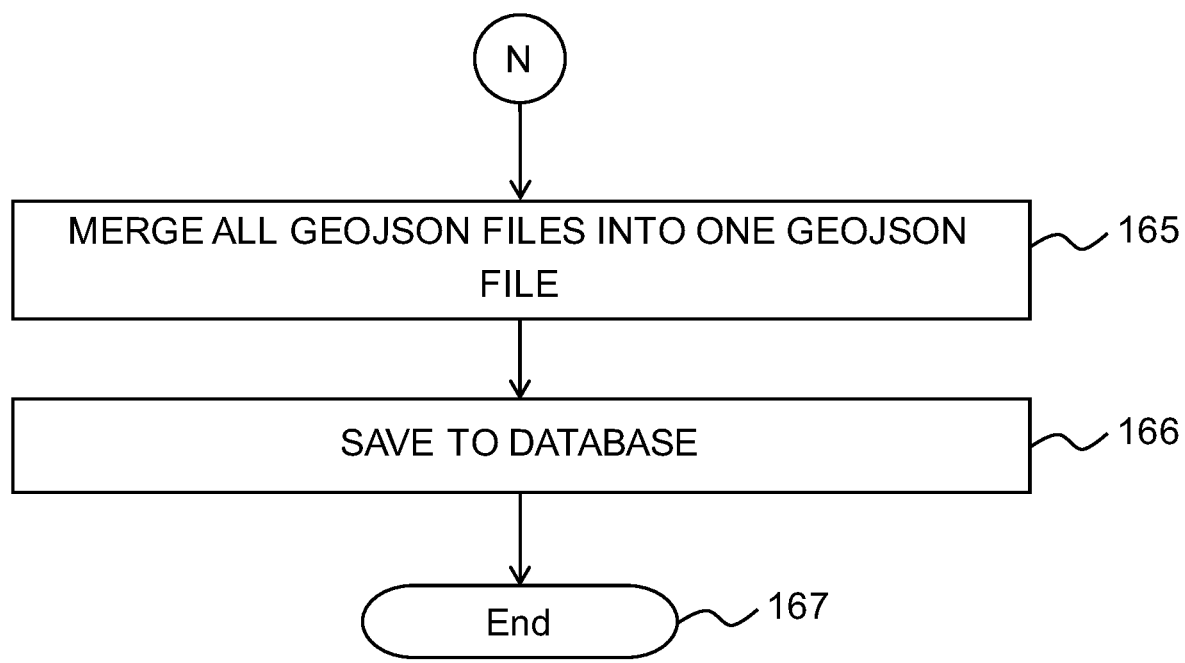

FIG. 22 depicts continuation of the process of generating information about property in GIS format. In a block 165, all GeoJSON files created in the process from block 100 to 164 are merged in one GeoJSON file and saved to the database in server 11. That is accomplished by extracting and combining geospatial information from all of the separate image files into a single file that includes geospatial information for the property. This GeoJSON (GIS ready) sitemap is available for access and use by locator module when providing a sitemap marked with an addressable subpart in a property and path to it, as shown in FIG. 5.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A method for producing a geospatial sitemap for a property, comprising:
    obtaining boundary data that shows boundaries of the property in a geospatial format;
    saving the boundary data in a first file;
    converting the first file to a boundary image file that includes geospatial metadata that pertains to the boundary data;
    obtaining a sitemap of the property and storing as a sitemap image file;
    identifying, within the sitemap stored in the sitemap image file, regions that represent buildings and internal roads, including:
        creating a separate image file for each region, wherein geospatial information pertaining to each region and addressing information that pertains to each region are added to the separate image file for each region;
    performing the following for each region in the sitemap that represents a building:
        associating with the region, geospatial metadata from the boundary image file, the geospatial metadata providing geospatial information pertaining to the region, and
        associating with the region as metadata, addressing information that pertains to the region; and
    extracting and combining geospatial information from all of the separate image files into a single file that includes geospatial information for the property.

2. A method as in claim 1 wherein the boundary is by produced from publicly available street map information.

3. A method as in claim 1 wherein the boundary image file is in GeoTIFF format.

4. A method as in claim 1 wherein the single file is a GeoJSON file.

5. A method as in claim 1, additionally comprising the step of:
    removing regions from the sitemap that depict trees.

6. A method as in claim 1, wherein identifying the regions includes color coding the regions to indicate buildings, bodies of water, internal roads and trees.

7. A method as in claim 1, associating addressing information that pertains to the region, includes the following:
    finding, from within the sitemap, text for the region;
    extracting and recognizing the text; and,
    storing the text as metadata for the region.

8. A method for producing a geospatial sitemap for a property, comprising:
    obtaining boundary data that shows boundaries of the property in a geospatial format;
    saving the boundary data in a first file;
    converting the first file to a boundary image file that includes geospatial metadata that pertains to the boundary data;
    obtaining a sitemap of the property and storing as a sitemap image file;
    identifying, within the sitemap stored in the sitemap image file, regions that represent buildings and internal roads; and,
    performing the following for each region in the sitemap that represents a building:
        associating with the region, geospatial metadata from the boundary image file, the geospatial metadata providing geospatial information pertaining to the region, and
        associating with the region as metadata, addressing information that pertains to the region;
    wherein identifying the regions includes:
        performing the following for each region in the sitemap that represents a building:
            adding to a separate image file for the region geospatial metadata for the property, where the geospatial metadata provides geospatial information pertaining to the region, and
            adding to the separate image file for the region addressing information that pertains to the region, and
        extracting and combining geospatial information from all of the separate image files into a single file that includes geospatial information for the property.

9. A method as in claim 8 wherein boundary data for the property in geospatial data format is produced based on publicly available street map information.

10. A method as in claim 8 wherein the single file is a GeoJSON file.

11. A method as in claim 8, additionally comprising the step of:
    removing regions from the sitemap that depict trees.

12. A method as in claim 8, wherein identifying the regions includes color coding the regions to indicate buildings, bodies of water, internal roads and trees.

13. A method as in claim 8, associating addressing information that pertains to the region, includes the following:
    finding, from within the sitemap, text for the region;
    extracting and recognizing the text; and
    storing the text as meta data for the region.

* * * * *